(12) United States Patent
Zuk et al.

(10) Patent No.: US 9,800,491 B1
(45) Date of Patent: *Oct. 24, 2017

(54) APPLICATION BASED PACKET FORWARDING

(71) Applicant: Palo Alto Networks, Inc., Santa Clara, CA (US)

(72) Inventors: Nir Zuk, Menlo Park, CA (US); Yonghui Cheng, Cupertino, CA (US); Wilson Xu, San Jose, CA (US); Monty Sher Gill, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,442

(22) Filed: Dec. 16, 2016

Related U.S. Application Data

(63) Continuation of application No. 14/476,676, filed on Sep. 3, 2014, now Pat. No. 9,565,097, which is a continuation of application No. 12/344,067, filed on Dec. 24, 2008, now Pat. No. 8,873,556.

(51) Int. Cl.
| | | |
|---|---|---|
| *H04L 12/725* | (2013.01) | |
| *H04L 12/741* | (2013.01) | |
| *H04L 12/721* | (2013.01) | |

(52) U.S. Cl.
CPC ............ *H04L 45/306* (2013.01); *H04L 45/38* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 2005/0265331 A1* | 12/2005 | Stolfo | G06F 21/552 370/389 |
| 2008/0080518 A1* | 4/2008 | Hoeflin | H04L 63/1416 370/395.42 |
| 2010/0054278 A1 | 3/2010 | Stolfo | |

* cited by examiner

*Primary Examiner* — Faruk Hamza
*Assistant Examiner* — Thinh Tran
(74) *Attorney, Agent, or Firm* — Van Pelt, Yi & James LLP

(57) ABSTRACT

Methods, systems, and apparatus, including computer program products, featuring receiving at a network device a plurality of packets associated with a flow, one or more of the plurality of packets having associated header data and content. Based on the content of one or more first packets in the plurality of packets, the network device identifies an application associated with the flow, where none of the first packets is addressed to the network device. For one or more second packets associated with the flow, the network device determines a forwarding destination for the second packets based on the application associated with the flow and forwards the packet according to the determined forwarding destination.

24 Claims, 5 Drawing Sheets

APPLICATION BASED PACKET FORWARDING

CROSS REFERENCE TO OTHER APPLICATIONS

This application is a continuation of co-pending U.S. patent application Ser. No. 14/476,676, entitled APPLICATION BASED PACKET FORWARDING, filed Sep. 3, 2014, which is a continuation of U.S. patent application Ser. No. 12/344,067, now U.S. Pat. No. 8,873,556, entitled APPLICATION BASED PACKET FORWARDING, filed Dec. 24, 2008, both of which are incorporated herein by reference for all purposes.

BACKGROUND

Generally speaking, a router is a device in a packet based computer network that handles connections between two or more networks. Routers determine destinations for packets and thus control the flow of data through networks. A router uses a routing protocol to determine the destination of a given packet. Some routing protocols are interior routing protocols (e.g., Routing Information Protocol (RIP), Open Shortest Path First (OSPF), Enhanced Interior Gateway Routing Protocol (EIGRP), and so on) that operate within a single routing domain. Other routing protocols are exterior routing protocols (e.g., Border Gateway Protocol (BGP), Exterior Gateway Protocol (EGP), Constrained Shortest Path First (CSPF), and so on) that are used to route between separate routing domains.

Some routers use policy based routing. A network administrator can set network policies for the router to follow. For example, a policy based router can be configured to allow, deny, or specially route packets based on the identity of a source or destination, transmission protocols, size of packets, and so on. Some routers that use policy based routing route based on an application associated with packets. These routers attempt to determine the application based on the source or destination port numbers of the packets. However, determining an application in this manner will often be inaccurate because multiple applications can share a port number. For example, many applications run in web browsers and thus use port 80 which is associated with Hyper Text Transfer Protocol (HTTP).

SUMMARY

In general, one or more aspects of the subject matter described in this specification can be embodied in one or more methods that include receiving at a network device a plurality of packets associated with a flow, one or more of the plurality of packets having associated header data and content. Based on the content of one or more first packets in the plurality of packets, the network device identifies an application associated with the flow, where none of the first packets is addressed to the network device. For one or more second packets associated with the flow, the network device determines a forwarding destination for the second packets based on the application associated with the flow and forwarding the packet according to the determined forwarding destination. Other embodiments of this aspect include corresponding systems, apparatus, and computer program products.

These and other embodiments can optionally include one or more of the following features. Each of the plurality of packets can be a Transmission Control Protocol (TCP)/Internet Protocol (IP) packet. The flow can comprise a sequence of one or more packets communicating information between a source and a destination in a TCP connection. Receiving a plurality of packets associated with the flow can include determining that the plurality of packets are associated with the flow, including for each packet: identifying a tuple based on the packet including a source address, a source port, a destination address, and a destination port; and identifying a flow record based on the identified tuple in a flow table corresponding to the flow.

Identifying the application can include: reassembling two or more of the first packets; and performing at least one of the following on the content of the reassembled two or more of the first packets: signature matching, fixed pattern matching, regular expression matching, heuristic analysis, and statistical analysis. Determining a forwarding destination for the packet can include: using a policy based routing table, where the table associates applications with forwarding decisions. The network device can be a router or a switch.

In general, one or more aspects of the subject matter described in this specification can be embodied in one or more methods that include receiving at a network device a plurality of first packets associated with a flow until an application associated with the flow is identified based on content of at least one of the first packets, where none of the first packets is addressed to the network device. While receiving the first packets, for each of one or more of the first packets the network device: forwards the packet to a destination; and attempts to identify the application associated with the flow based on the content of at least one of the first packets. After the application is identified, the network device: receives one or more second packets associated with the flow; and determines a forwarding destination for the second packets based on the application. Other embodiments of this aspect include corresponding systems, apparatus, and computer program products.

These and other embodiments can optionally include one or more of the following features. Each of the plurality of first packets can be a Transmission Control Protocol (TCP)/Internet Protocol (IP) packet. The flow can comprise a sequence of one or more packets communicating information between a source and a destination in a TCP connection. Receiving a plurality of first packets associated with the flow can include determining that the plurality of first packets are associated with the flow, including for each packet: using the packet, identifying a tuple including a source address, a source port, a destination address, and a destination port; and using the tuple, identifying a flow record in a flow table corresponding to the flow.

Attempting to identify the application can include: reassembling two or more of the first packets; and performing at least one of the following on the content of the reassembled two or more of the first packets: signature matching, fixed pattern matching, regular expression matching, heuristic analysis, and statistical analysis. Determining a forwarding destination for the further data packets based on the application can include: using a policy based routing table, where the table associates applications with forwarding decisions. The network device can be a router or a switch.

Particular embodiments of the invention can be implemented to realize one or more of the following advantages. First, network traffic can be routed according to the application generating the traffic, regardless of the port it uses. For example, web-based corporate traffic can be prioritized over personal web browsing traffic. Second, the application generating the traffic can be determined based on the contents of the packets, which makes it more difficult for applications to disguise their traffic. For example, an application cannot cause its traffic to appear as web browser traffic simply by using a Transmission Control Protocol (TCP) port associated with a web browser. Third, network costs can be reduced. For example, traffic associated with applications that are sensitive to latency can be routed through more expensive network connections, and traffic associated with applications that are not sensitive to latency can be routed through less expensive network connections.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
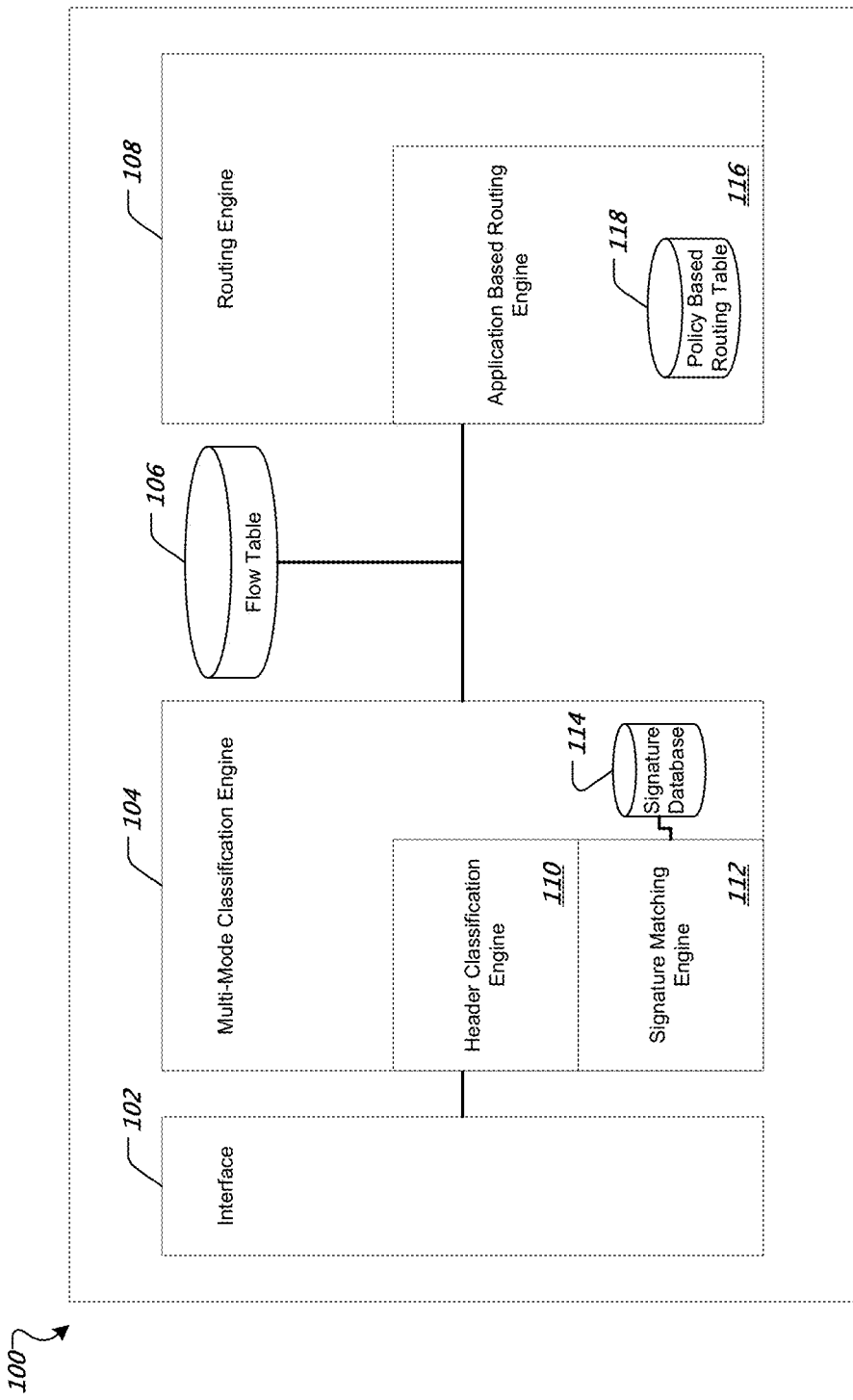
FIG. 1 shows a block diagram of an example network device.

FIG. 1 shows a block diagram of an example network device 100. In some implementations, the network device 100 includes an interface 102 for incoming and outgoing packets, a multi-mode classification engine 104, a flow table 106, and a routing engine 108.

The interface 102 can include, for example, one or more Ethernet ports for receiving and sending packets. In general, the packets are Transmission Control Protocol/Internet Protocol (TCP/IP) packets. Alternatively, the packets are User Datagram Protocol/Internet Protocol (UDP/IP) packets, Real Time Transport Protocol (RTP) packets, or other types of packets. When the network device 100 receives packets, the packets are analyzed by a multi-mode classification engine 104 to attempt to determine an application associated with the packets. The multi-mode classification engine can also attempt to classify other attributes of the packets. Examples of multi-mode classification engines are described in U.S. patent application Ser. No. 11/475,393, entitled "Packet Classification in a Network Security Device." Other classification engines are possible.

In some implementations, the multi-mode classification engine 104 includes plural modes for classifying incoming packets that are updated as more packets are received. Multi-mode classification engine 104 includes a header classification engine 110 and a signature matching engine 112.

The header classification engine 110 uses information located in a header of a received packet to classify packets for further processing. For example, in some implementations the header classification engine 110 identifies state information, for instance, a five-tuple of information about each packet, including protocol, source address, source port, destination address, and destination port. Other techniques for header classification are possible.

The signature matching engine 112 classifies packets for further processing based on signatures detected, for example at the application level. The signature matching engine 112 uses the contents of received packets. In general, the signature matching engine 112 includes a signature database 114 that is typically local. In some implementations, the signature database 114 is distributed onto devices remote from the network device 100. Signature matching can include fixed pattern matching, regular expression matching, and specialized matching performed by, for example, specialized software to detect complex application behavior patterns or a combination of the above. In some implementations, the multi-mode classification engine 104 performs Transmission Control Protocol (TCP) reassembly before performing signature matching or other analysis to determine an application associated with received packets.

The network device 100 includes a flow table 106. The flow table 106 includes flow records associated with flows. Examples of flow tables are described in U.S. patent application Ser. No. 11/475,393, entitled "Packet Classification in a Network Security Device." Other flow tables are possible.

A flow is a sequence of one or more packets communicating information between a source and a destination. A flow typically includes packets going in one direction (source to destination or the reverse) but in some implementations can include packets going in both directions. For example, in some implementations, a flow is a TCP connection or one side of a TCP connection (going only from a source to a destination).

The flow records in the flow table 106 include flow information. In some implementations, flow information includes information identifying an application associated with a flow. The signature matching engine 112 attempts to identify applications associated with flows and when it is successful it updates the flow table 106.

The network device 100 includes a routing engine 108. The routing engine can route packets using routing protocols, for example, the Border Gateway Protocol (BGP). Based on routing decisions, the network device 100 sends packets to certain physical ports using the interface 102.

Routing engine 108 also includes an application based routing engine 116. In some implementations, the application based routing engine 116 uses flow information in the flow table 106 to identify applications associated with flows. The application based routing engine 116 uses a policy based routing table 118 to determine whether packets associated with certain applications should be routed according to defined policies. In some implementations, the policy based routing table includes policies based on variables other than application, for example, user identification or transmission protocol or the like.

In some implementations, the application based router implements quality of service policies, which can be specified in the policy based routing table 118. For example, in some implementation, the router attempts to guarantee a required bit rate, delay, jitter, packet dropping probability, or bit error rate. The application based routing engine 116 typically routes all packets associated with a flow in the same manner.

Figure 2:
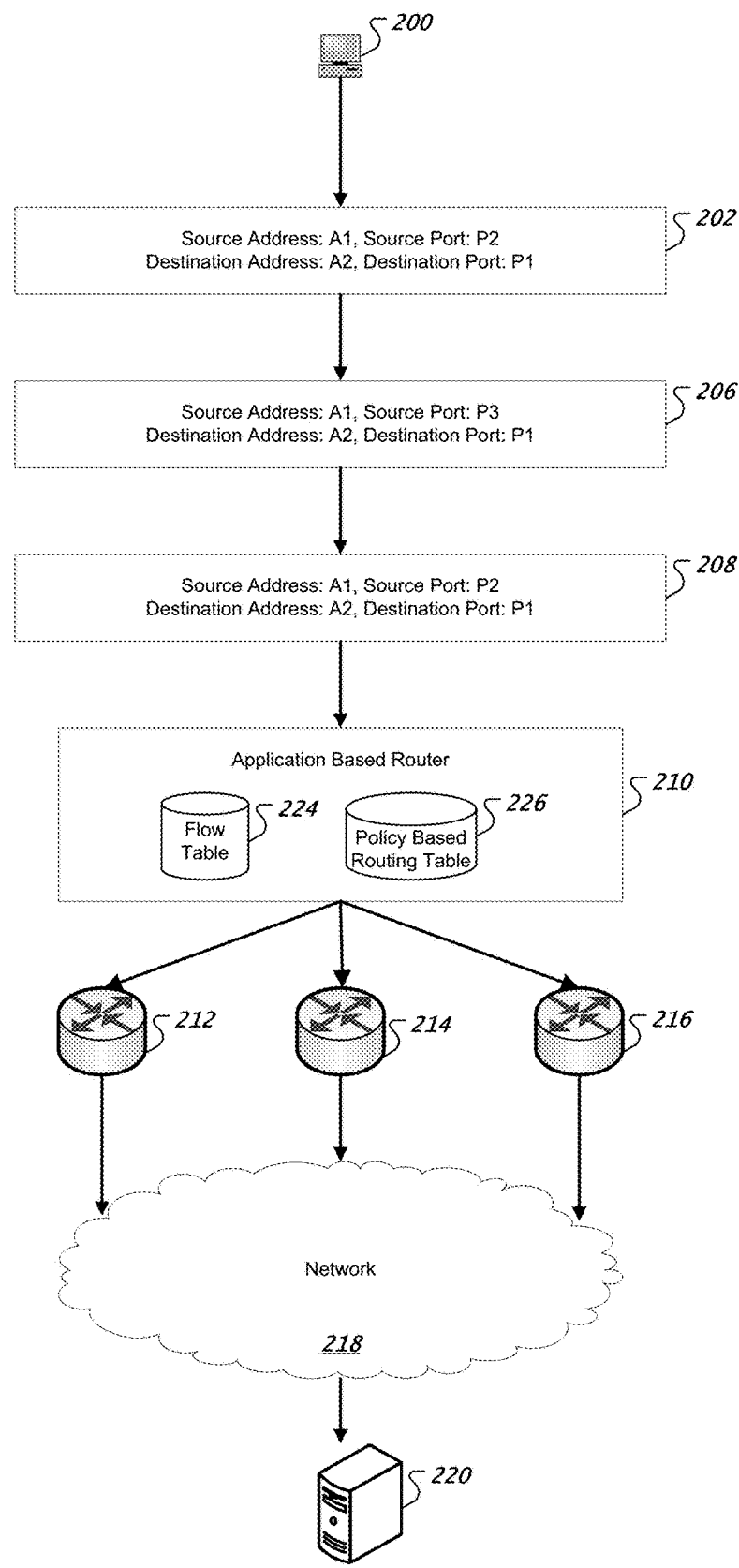
FIG. 2 is a diagram of an example scenario where a client is communicating with a server through an application based router.

FIG. 2 is a diagram of an example scenario where a client 200 is communicating with a server 220 through an application based router 210. This example scenario is one possible scenario and is used for purposes of illustration. Other scenarios are possible.

The client 200 is sending four TCP/IP packets 202, 206, and 208. Each packet has associated header data and content. The header data includes a source address, a source port, a destination address, and a destination port.

The client 200 has an IP address "A1." Each of the packets was sent from a web browser on client 200, and the web browser uses port "P1." Therefore, each packet has a source IP address of A1 and a destination port of P1.

The first packet 208 sent by the client 200 has a destination address "A2" and a source port "P2." When the first packet 208 arrives at the application based router 210, the application based router 210 determines whether there is a flow record in its flow table 224 for a flow associated with TCP/IP packets having source address A1, source port P2, destination address A2, and destination port P1. For purposes of illustration, this example scenario considers a case where there is no flow record in the flow table. Consequently, the application based router 210 creates a new flow record.

Based on the content of the first packet 208, the application based router attempts to identify an application associated with the first packet 208. For purposes of illustration, this example scenario considers a case where the application based router 210 is unable to identify an application based only on the first packet 208. The application based router 210, using a routing protocol and the destination address A2, forwards the first packet 208 to a first router 212. In some implementations, the application based router 210 also stores a copy of the first packet 208. In various implementations, the copy is encoded, compressed, or redacted. The first router 212 forwards the first packet 208 onto a network 218 that routes the first packet 208 to server 220, which has an IP address "A2." Server 220 makes the first packet 208 available to an application using port P1.

The second packet 206 also has a destination address of A2, but it has a source port of "P3." So the second packet 206 is associated with a different flow than the first packet 208. The application based router 210 checks the flow table 224 to see if a flow record exists for a flow with source address A1, source port P3, destination address A2, and destination port P1.

For purposes of illustration, this example scenario considers a case where a flow record exists and includes an identification of an application associated with the flow. Thus the application based router 210 routes the second packet 206 using the identified application. In some implementations, the application based router 210 uses routing information in the flow table 224. In other implementations, the application based router 210 uses a policy based routing table 226 to determine whether there is a routing policy for the identified application.

For purposes of illustration, this example scenario considers a case where the application based router 210 decides to forward the second packet 206 to a second router 214. Thus, the second packet 206 is routed differently from the first packet 208 even though both packets are destined for the same IP address and the same port.

The third packet 202 has the same source address, source port, destination address, and destination port as the first packet 208. Thus, the third packet 202 is associated with the same flow as the first packet 208. The application based router 210 consults the flow table 224 and, because it added a flow record while processing the first packet 208, finds a flow record for the flow. However, because the application based router 210 was unable to determine an application based on just the first packet 208, the flow record does not identify an application associated with the flow.

The application based router 210 attempts to identify an application associated with the flow based on the contents of packets associated with the flow. For example, in some implementations, the application based router 210 uses a multi-mode classification engine 104. If the application based router 210 kept a copy of the first packet, the application based router 210 optionally uses the contents of both the first packet 208 and the third packet 202. Otherwise, the application based router 210 uses only the third packet 202.

For purposes of illustration, this example scenario considers a case where the application based router 210 successfully identifies an application using the third packet 202. The application based router 210 uses the identified application and the policy based routing table 226 to determine where to forward the third packet 202. In some implementations, the application based router 210 updates the flow table 224 to include routing instructions for future packets associated with the flow.

For purposes of illustration, this example scenario considers a case where the application based router 210 decides to forward the third packet 202 to a third router 216. Thus, the third packet 202 is routed differently from the first packet 208 even though both packets are associated with the same flow. The first packet 208 was routed before an application associated with it could be identified, and the third packet 202 was routed based on the identified application.

Figure 3:
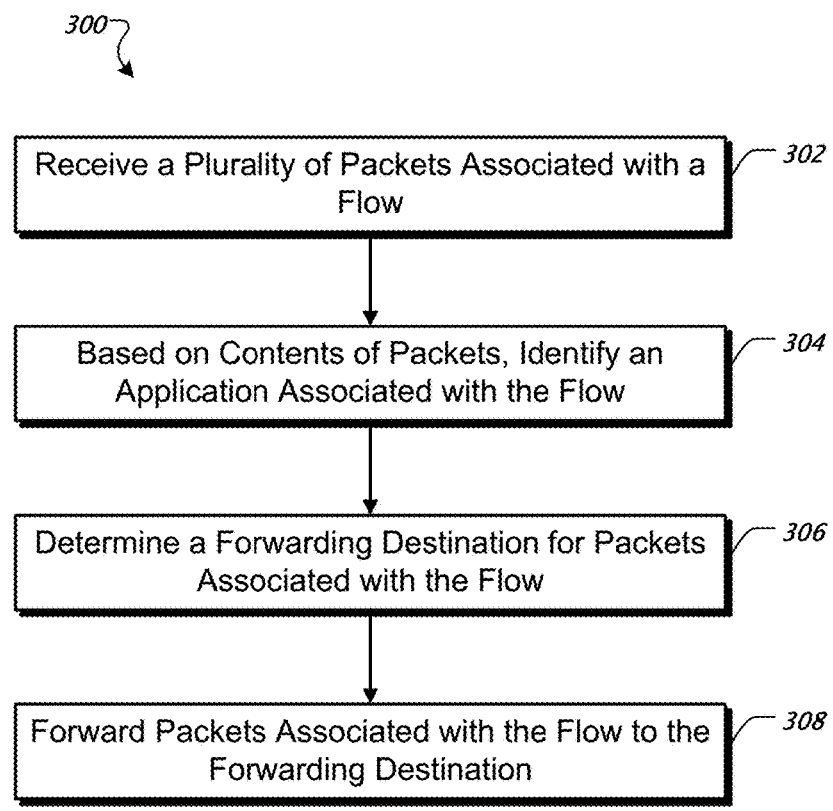
FIG. 3 shows a flow diagram of an example technique for processing packets.

FIG. 3 shows a flow diagram of an example technique 300 for processing packets. For purposes of illustration, the technique 300 will be described with respect to a network device that performs the technique. A network device is a device that processes packets, for example, a router, a switch, or the like.

The network device receives a plurality of packets associated with a flow (step 302). Typically, the packets are TCP/IP packets. The network device determines that the packets are associated with the flow by identifying state information associated with packets. State information is information identifying or regarding a flow. State information can include, for example, a 5-tuple of IP information including the IP source and destination addresses, TCP source and destination ports, and protocol type.

Based on the content of one or more first packets in the plurality of packets, the network device identifies an application associated with the flow (step 304). For example, in some implementations, the network device uses Deep Packet Inspection (DPI) to inspect the contents of the first packets and identify the application. In some implementations, the network device performs TCP reassembly on the first packets and then performs signature matching on the reassembled packets. In various implementations, the network device uses a multi-mode classification engine to identify applications.

An application is a software program or library that performs a task or group of tasks, such as word processing, communications, or database management. In some implementations, the network device identifies various kinds of applications, including applications operated by users, applications running in a background mode, applications that work with or are part of system software or middleware, and so on. In other implementations, the network device only identifies applications that operate at the direction of a user. For example, the network device would not identify system software.

None of the first packets is addressed to the network device. For example, none of the first packets is a control packet addressed to the network device indicating that, for instance, certain other packets are multimedia packets.

For one or more second packets associated with the flow, the network device determines a forwarding destination based on the application associated with the flow (step 306). For example, the network device can determine that all packets associated with the flow should be forwarded to a predetermined destination for the application associated with the flow. In another example, the network device uses the identification of the application in combination with a non-application based routing protocol. For instance, the network device can narrow the number of possible forwarding destinations using a routing protocol, and then select the least or most expensive forwarding destination based on the application associated with the flow.

In some implementations, the network device determines the forwarding destination using a policy based routing table. In some implementations, the policy based routing table includes records for applications that include rules or policies for flows associated with those applications. For example, the policy based routing table can indicate that packets associated with applications for personal use (e.g., associated with an application such as YouTube or Instant Messenger) should be routed using a lower-speed connection than packets associated with applications for business use (e.g., associated with salesforce.com or the like).

In some implementations, the policy based routing table includes policies based on variables other than application, for example, user identification, transmission protocol, time of day, and the like. In some implementations, the network device uses combination rules to combine policies based on the other variables. For example, if a policy based on user identification indicates that a packet should be forwarded to a first destination, but a policy based on application indicates that the packet should be forwarded to a second destination, the network device can use a rule (e.g., that application policies have preference over user identification policies, or the like) to decide whether to forward the packet to the first or second destination. In various implementations, a network administrator maintains and updates the policy based routing table.

In some implementations, the network device changes policies over time based on observed characteristics of the traffic, for example application usage. For instance, the network device can forward packets associated with a certain application to a first destination until traffic associated with the application exceeds a threshold, and then forward packets associated with application to a second destination. The threshold can be, for example, a predetermined volume of traffic or percentage of total traffic.

The network device forwards the packet according to the determined forwarding destination (308).

Figure 4:
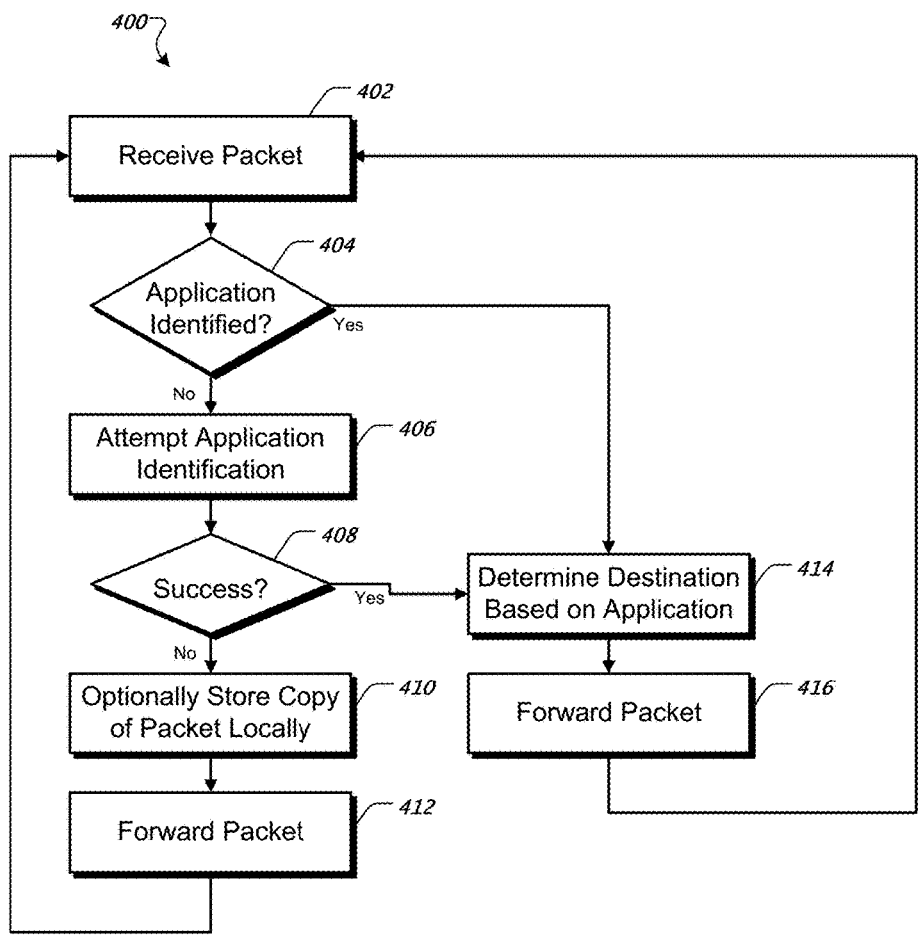
FIG. 4 shows a flow diagram of an example technique for determining forwarding destinations for packets.

FIG. 4 shows a flow diagram of an example technique 400 for determining forwarding destinations for packets. For purposes of illustration, the technique 400 will be described with respect to a network device that performs the technique.

The network device receives a packet (step 402). The network device determines whether an application associated with the packet has been identified (step 404). In some implementations, the network device determines whether a flow record for an associated flow in a flow table identifies an application associated with the flow.

If an application associated with the packet has been identified, then the network device determines a destination based on the application (step 414) and forwards the packet to the destination (step 416). In some cases, the network device will not have a routing policy or rule for packets associated with the identified application. In those cases, the network device determines a destination and forwards the packet in the same manner that it forwards packets associated with an unknown (to the network device) application. For example, in some implementations, the network device uses a routing protocol.

If an application associated with the packet has not been identified, then the network device attempts to identify the application (step 406). The network device attempts identification using the content of one or more packets associated with the flow associated with the packet. In some implementations, the network device performs TCP reassembly on a plurality of packets and then performs signature matching on the packets to attempt identification of the application.

If the network device successfully identifies the application (step 408), then the network device determines a destination based on the application (step 414) and forwards the packet to the destination (step 416). If the network device is unable to determine a rule or policy based on the application, then the network device determines a destination and forwards the packet in the same manner that it forwards packets associated with an unknown application. If the network device is unsuccessful (step 408), then the network device optionally stores a copy of the packet locally (step 410) and forwards the packet without knowing an associated application (step 412). In some implementations, the copy is encoded, compressed, or redacted.

The technique can be repeated to process a plurality of packets, including processing packets before an application is identified and processing packets differently after an application is identified. Thus, the network device receives a plurality of first packets associated with a flow until the network device identifies an application associated with the flow based on the content of at least one of the first packets, where none of the first packets is addressed to the network device. While receiving the first packets, for each of one or more of the first packets, the network device forwards the packet to a destination, stores a local copy of the packet, and attempts to identify the application associated with the flow based on the content of at least one of the first packets. After the network device identifies the application, the network device receives one or more second packets associated with the flow and determines a forwarding destination for the second packets based on the application.

Figure 5:
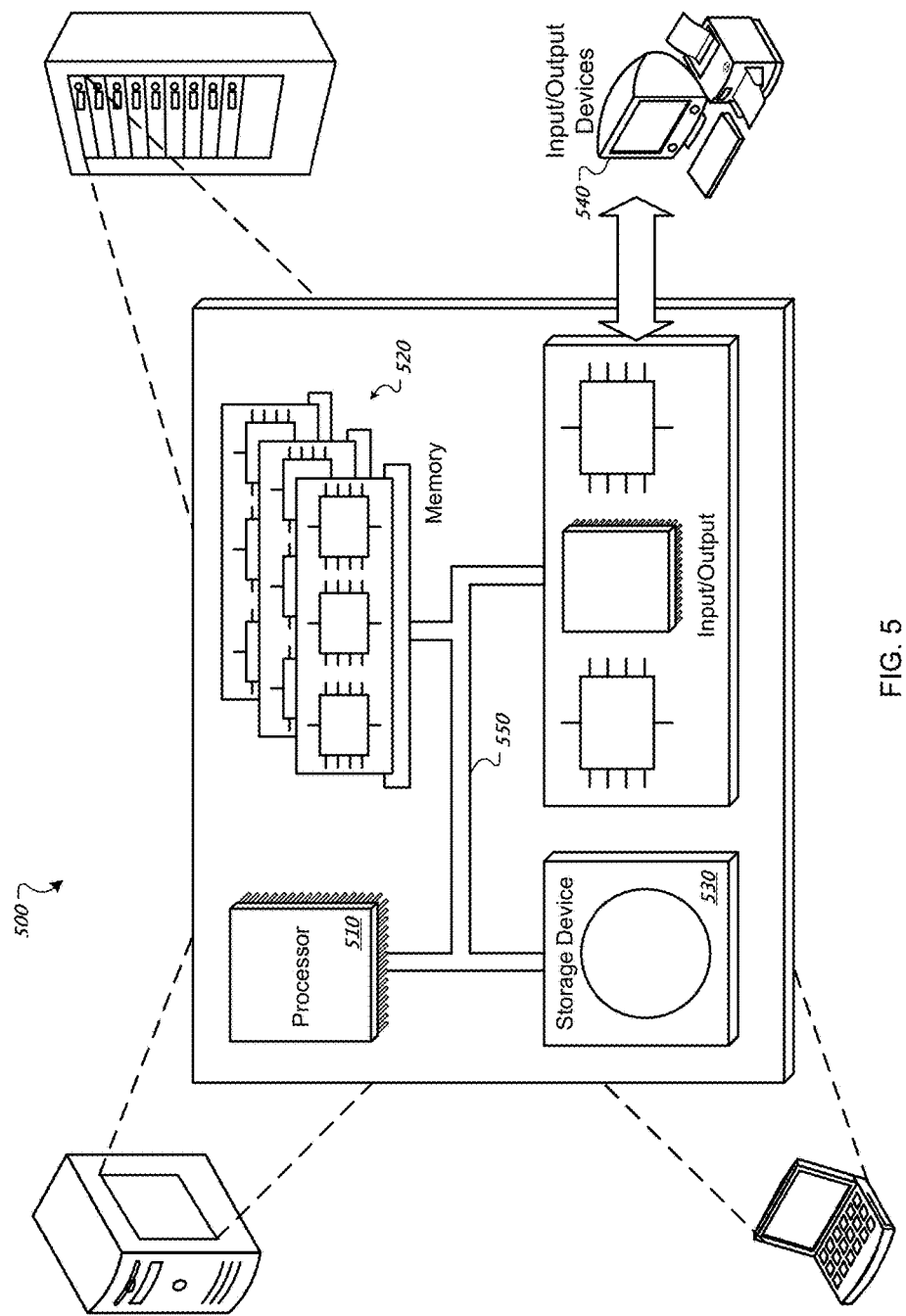
FIG. 5 is a schematic diagram of a generic computer system.

FIG. 5 is a schematic diagram of a generic computer system 500. The system 500 can be used for practicing operations described in association with the techniques 300 and 400. The system 500 can include a processor 510, a memory 520, a storage device 530, and input/output devices 540. Each of the components 510, 520, 530, and 540 are interconnected using a system bus 550. The processor 510 is capable of processing instructions for execution within the system 500. Such executed instructions can implement one or more components of security device 102, for example. In some implementations, the processor 510 is a single-threaded processor. In other implementations, the processor 510 is a multi-threaded processor. The processor 510 is capable of processing instructions stored in the memory 520 or on the storage device 530 to display graphical information for a user interface on the input/output device 540.

The memory 520 is a computer readable medium such as volatile or non volatile that stores information within the system 500. The memory 520 can store data structures representing flow tables, for example. The storage device 530 is capable of providing persistent storage for the system 500. The storage device 530 can be a floppy disk device, a hard disk device, an optical disk device, or a tape device, or other suitable persistent storage means. The input/output device 540 provides input/output operations for the system 500. In some implementations, the input/output device 540 includes a keyboard and/or pointing device. In various implementations, the input/output device 540 includes a display unit for displaying graphical user interfaces.

The input/output device 540 can provide input/output operations for a security device. For example, the input/output device 540 can include Ethernet ports or other networking ports to communicate with computer networks.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In some implementations, users can interact with a network device using a computer on a network. For example, a user on a personal computer can interact with a network device connected on the network using a web browser, a Secure Shell (SSH) client, a telnet client, or the like. In various implementations, a user can interact with a network device using a computer connected to the security device on a serial port, for example, a Recommended Standard 232 (RS-232) port.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A system for processing packets at a network device, comprising:
    a processor configured to:
        receive a plurality of packets associated with a flow, wherein one or more of the plurality of packets has associated header data and content;
        identify an application associated with the flow based on a content of two or more first packets in the plurality of packets, wherein none of the first packets is addressed to the network device, and wherein identifying the application includes performing an analysis on the content of the two or more of the first packets; and
        determine a forwarding destination is a first destination for one or more second packets associated with the flow based on the application associated with the flow using an application based policy, wherein the application based policy indicates that the one or more second packets are forwarded to the first destination and a non-application based policy indicates that the one or more second packets are forwarded to a second destination, and wherein the network device is configured with a rule that the application based policy has preference over the non-application based policy; and
        forward the one or more second packets to the first destination; and
    a memory coupled to the processor and configured to provide the processor with instructions.

2. The system recited in claim 1, wherein identifying the application includes reassembling two or more of the first packets, and performing the analysis on the content of the reassembled two or more of the first packets.

3. The system recited in claim 1, wherein identifying the application includes classifying the content of the two or more first packets for identifying the application based on signature matching.

4. The system recited in claim 1, wherein identifying the application includes classifying the content of the two or more first packets for identifying the application based on signature matching, and wherein a plurality of signatures are stored in a signature database.

5. The system recited in claim 1, wherein identifying the application includes classifying the content of the two or more first packets for identifying the application based on signature matching, wherein a plurality of signatures are stored in a signature database, and wherein signature matching comprises one or more of the following: fixed pattern matching, regular expression matching, and detecting one or more application behavior patterns.

6. The system recited in claim 1, wherein identifying the application includes reassembling two or more of the first packets and classifying the content of the reassembled two or more of the first packets for identifying the application based on signature matching, wherein a plurality of signatures are stored in a signature database, and wherein signature matching comprises one or more of the following: fixed pattern matching, regular expression matching, and detecting one or more application behavior patterns based on a heuristic analysis or a statistical analysis.

7. The system recited in claim 1, further comprising:
store a flow record corresponding to the flow in a flow table.

8. The system recited in claim 1, wherein each of the plurality of packets is a Transmission Control Protocol (TCP)/Internet Protocol (IP) packet, wherein the flow comprises a sequence of one or more packets communicating information between a source and a destination in a TCP connection, and wherein the processor is further configured to:
determine that the plurality of packets is associated with the flow, including for each packet:
identify a tuple based on the packet including a source address, a source port, a destination address, and a destination port; and
identify a flow record based on the identified tuple in a flow table corresponding to the flow.

9. The system recited in claim 1, wherein identifying the application includes reassembling two or more of the first packets and classifying the content of the reassembled two or more of the first packets for identifying the application based on performing signature matching and at least one of fixed pattern matching, regular expression matching, and statistical analysis on the content of the reassembled two or more of the first packets.

10. The system recited in claim 1, wherein the application based policy comprises a policy based routing table.

11. The system recited in claim 1, wherein determining the forwarding destination for the one or more second packets associated with the flow based on the application includes using a policy based routing table, and wherein the policy based routing table associates applications with forwarding decisions.

12. The system recited in claim 1, wherein the non-application based policy includes a user identification based policy.

13. The system recited in claim 1, wherein the network device is a router or a switch.

14. The system recited in claim 1, wherein the network device is a switch.

15. A method for processing packets at a network device, the method comprising:
receiving a plurality of packets associated with a flow, wherein one or more of the plurality of packets has associated header data and content;
identifying an application associated with the flow based on a content of two or more first packets in the plurality of packets, wherein none of the first packets is addressed to the network device, and wherein identifying the application includes performing an analysis on the content of the two or more of the first packets;
determining a forwarding destination is a first destination for one or more second packets associated with the flow based on the application associated with the flow using an application based policy, wherein the application based policy indicates that the one or more second packets are forwarded to the first destination and a non-application based policy indicates that the one or more second packets are forwarded to a second destination, and wherein the network device is configured with a rule that the application based policy has preference over the non-application based policy; and
forwarding the one or more second packets to the first destination.

16. The method of claim 15, wherein each of the plurality of packets is a Transmission Control Protocol (TCP)/Internet Protocol (IP) packet, wherein the flow comprises a sequence of one or more packets communicating information between a source and a destination in a TCP connection, and wherein the method further comprises:
receiving a plurality of first packets associated with the flow comprises determining that the plurality of first packets are associated with the flow, including for each packet:
using the packet, identifying a tuple including a source address, a source port, a destination address, and a destination port; and
using the tuple, identifying a flow record in a flow table corresponding to the flow.

17. The method of claim 15, wherein identifying the application further comprises:
reassembling two or more of the first packets; and
performing signature matching and at least one of fixed pattern matching, regular expression matching, and statistical analysis on the content of the reassembled two or more of the first packets.

18. The method of claim 15, wherein determining the forwarding destination for the one or more second packets associated with the flow based on the application includes using a policy based routing table, and wherein the policy based routing table associates applications with forwarding decisions.

19. The method of claim 15, wherein the network device is a router or a switch.

20. A computer program product for processing packets at a network device, the computer program product being embodied in a non-transitory tangible computer readable storage medium and comprising computer instructions for:
receiving a plurality of packets associated with a flow, wherein one or more of the plurality of packets has associated header data and content;
identifying an application associated with the flow based on a content of two or more first packets in the plurality of packets, wherein none of the first packets is addressed to the network device, and wherein identifying the application includes performing an analysis on the content of the two or more of the first packets;

determining a forwarding destination is a first destination for one or more second packets associated with the flow based on the application associated with the flow using an application based policy, wherein the application based policy indicates that the one or more second packets are forwarded to the first destination and a non-application based policy indicates that the one or more second packets are forwarded to a second destination, and wherein the network device is configured with a rule that the application based policy has preference over the non-application based policy; and forwarding the one or more second packets to the first destination.

21. The computer program product recited in claim 20, wherein each of the plurality of packets is a Transmission Control Protocol (TCP)/Internet Protocol (IP) packet, wherein the flow comprises a sequence of one or more packets communicating information between a source and a destination in a TCP connection, and wherein the computer program product further comprises computer instructions for receiving a plurality of packets associated with the flow comprises determining that the plurality of packets are associated with the flow, including for each packet:

identifying a tuple based on the packet including a source address, a source port, a destination address, and a destination port; and identifying a flow record based on the identified tuple in a flow table corresponding to the flow.

22. The computer program product recited in claim 20, wherein identifying the application further includes:

reassembling two or more of the first packets; and performing signature matching and at least one of fixed pattern matching, regular expression matching, and statistical analysis on the content of the reassembled two or more of the first packets.

23. The computer program product recited in claim 20, wherein determining the forwarding destination for the one or more second packets associated with the flow based on the application includes using a policy based routing table, and wherein the policy based routing table associates applications with forwarding decisions.

24. The computer program product recited in claim 20, where the network device is a router or a switch.

* * * * *